United States Patent
Duan et al.

(10) Patent No.: US 7,962,158 B2
(45) Date of Patent: Jun. 14, 2011

(54) HANDLING METHOD AFTER UPDATING OF PRIVACY PROFILE OF TARGET USER EQUIPMENT

(75) Inventors: Xiaoqin Duan, Guangdong (CN); Zhengkai Ge, Guangdong (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 850 days.

(21) Appl. No.: 10/556,913

(22) PCT Filed: Oct. 9, 2004

(86) PCT No.: PCT/CN2004/001143
§ 371 (c)(1),
(2), (4) Date: Dec. 7, 2006

(87) PCT Pub. No.: WO2005/036900
PCT Pub. Date: Apr. 21, 2005

(65) Prior Publication Data
US 2007/0173253 A1    Jul. 26, 2007

(30) Foreign Application Priority Data
Oct. 10, 2003 (CN) ................ 2003 1 0100217

(51) Int. Cl.
*H04W 24/00*    (2009.01)
*H04M 3/16*    (2006.01)
*H04M 3/42*    (2006.01)

(52) U.S. Cl. ............. 455/456.5; 455/456.1; 455/456.2; 455/411; 455/414.1

(58) Field of Classification Search .......... 455/456, 455/456.5
See application file for complete search history.

(56) References Cited

U.S. PATENT DOCUMENTS
6,195,557 B1    2/2001    Havinis et al.
(Continued)

FOREIGN PATENT DOCUMENTS
EP    1337123 A    8/2003
(Continued)

OTHER PUBLICATIONS

3GPP TS 23.271, V6.5.0 (Sep. 2003), "3$^{rd}$ Generation Partnership Project; Technical Specification Group Services and System Aspects; Functional stage 2 description of LCS (Release 6)," Sep. 2003, 108 pages.

English Translation of the Written Opinion of the International Searching Authority, International application No. PCT/CN2004/001143, Date of mailing Jan. 27, 2005, 3 pages.

Chinese Office Action 2003101002171, Date stamped Jun. 9, 2006, 6 pages.

(Continued)

*Primary Examiner* — Lester Kincaid
*Assistant Examiner* — Yu (Andy) Gu
(74) *Attorney, Agent, or Firm* — Slater & Matsil, L.L.P.

(57) ABSTRACT

The present invention discloses a handling method after updating of privacy profile of a target user equipment (UE). When the location service (LCS) system is aware that the privacy profile of a target UE was updated, for every outstanding Location Request against that UE, the location service (LCS) system perform a new privacy check based on the updated privacy profile. If the said location request passes the privacy check, the location service system continues to handle the said location request until the handling process is ended; if the location request fails in the privacy check, the location service system initials a cancellation procedure to the said location request. In accordance with this invention, When the location service (LCS) system is aware that the privacy profile of a target UE was updated, the LCS system will be able to perform a new privacy check for the location request based on the updated privacy profile of the target UE, and implement corresponding processing depending on the result of the privacy check for the location request, e.g. for a location request fails in the privacy check, the LCS system shall initiate a cancellation procedure. In this case, the processing is ended earlier and the system resource is saved.

15 Claims, 4 Drawing Sheets

U.S. PATENT DOCUMENTS

| | | | |
|---|---|---|---|
| 7,072,886 B2 * | 7/2006 | Salmenkaita et al. | 1/1 |
| 2003/0153310 A1 * | 8/2003 | Ishii | 455/435 |
| 2003/0153332 A1 * | 8/2003 | Evensen et al. | 455/456 |
| 2004/0147252 A1 | 7/2004 | Strom | |
| 2006/0135174 A1 * | 6/2006 | Kraufvelin et al. | 455/456.1 |
| 2006/0258369 A1 * | 11/2006 | Burroughs et al. | 455/456.1 |

FOREIGN PATENT DOCUMENTS

| | | |
|---|---|---|
| WO | WO 02054814 A | 7/2002 |
| WO | WO 02/076136 A1 | 9/2002 |

OTHER PUBLICATIONS

Communication of a notice of opposition, Application No./Patent No. 04762273.3-2412/1672935, dated Sep. 22, 2008, 5 pages.

Notice of Opposition submitted by Kraus & Weiser, European Patent No. 1 672 935, dated Sep. 12, 2008, 20 pages.

Response to Notice of Opposition submitted by Mitscherlich & Partner, European Patent No. 1 672 935 B1, dated Apr. 27, 2009, 11 pages.

European Office Action 04 762 273.3, Dated Jul. 26, 2006, 5 pages.

* cited by examiner

HANDLING METHOD AFTER UPDATING OF PRIVACY PROFILE OF TARGET USER EQUIPMENT

CROSS-REFERENCE TO RELATED APPLICATIONS

This application claims priority to Patent Cooperation Treaty (PCT) Application No. PCT/CN2004/001143, filed on Oct. 9, 2004, entitled, "A PROCESSING METHOD AFTER PRIVACY INFORMATION OF A TARGET USER EQUIPMENT IS MODIFIED" which claims priority to Chinese Patent Application Serial No. 200310100217.1, filed Oct. 10, 2003, all of the disclosures of which are incorporated herein by reference in their entirety.

FIELD OF THE TECHNOLOGY

The present invention relates to positioning techniques, particularly to a handling method after update of privacy profile of target user equipment (UE).

BACKGROUND OF THE INVENTION

The location service of a mobile communications network is to obtain the location information of target UE by means of positioning techniques, where the target UE refers to a user terminal in a mobile communication network to be positioned and the location information may be the geographical information expressed in latitude and longitude data or the location information with reference to local streets. The location information obtained by an LCS system may be provided for the user that uses the target UE for self-positioning, for the communication system itself for use in area-specific charging or operational maintenance, or for other clients, for instance, agencies or individuals, requesting the location information of the target UE for use in value-added services. Therefore, location service has wide applications in such fields as contingency rescue, vehicle navigation and intelligent traffic system, job control and team management, mobile yellow page query, and enhanced network performance. In 3GPP, specifications of LCS as well as the operational mode, structure, state description, and message flow for LCS implementation have been put forward.

FIG. 1 is a schematic showing the logical structure of the LCS functions. As shown in FIG. 1, in terms of functional logics, implementation of LCS involves LCS client 101, LCS system 107 that contains functions for implementing LCS, and target UE 108. Functions for implementing LCS include gateway mobile location center (GMLC) 102, user data storage server (HLR/HSS) 103, core network (CN) 104, radio access network (RAN) 105, and privacy profile register (PPR) 106. LCS client 101 comprises LCS clients and LCS clients. The LCS client refers to a software or hardware entity interfaced with GMLC 102 for use in obtaining the location information of one or more target UE 108. The LCS client refers to an application client, such as an agency or an individual, requesting the location information of a target UE, and is the initiator of a request for location information. An LCS client may be a LCS client at the same time. GMLC 102 provides a standard LCS interface for information interaction between the LCS client and functions implementing LCS to handle relevant messages of LCS, for instance, privacy check for LCS client 101 as well as privacy check for the location request sent by LCS client 101. In addition, GMLC 102 may request that PPR 106 which has stored the privacy data of target UE 108 makes privacy check for the location request sent by LCS client 101. After a successful privacy check, GMLC 102 makes a request to CN 104 for the location of target UE 108, CN 104 locates target UE 108 in coordination with RAN 105 and sends the location result of target UE 108 to GMLC 102, and finally GMLC 102 is responsible for sending the location result of target UE 108 to LCS client 101. HLR/HSS 103 is used to store user data and provide relevant information of target UE 108 for other logics of the network, for instance, the home GLMC of target UE 108, the current GMLC target UE 108 is visiting, and the address information of CN 104.

GMLC 102 may further include requesting GMLC (R-GMLC), home GMLC (H-GMLC), and visited GMLC (V-GMLC). R-GMLC is the GMLC receiving the location request for target UE 108 initiated by LCS client 101, H-GMLC is the home GMLC to which target UE 108 belongs, and V-GMLC is the GMLC target UE 108 is currently visiting, that is, the GMLC where target UE currently is. R-GMLC, H-GMLC, and V-GMLC may belong to the same public land mobile network (PLMN), or belong to different PLMNs. When R-GMLC, H-GMLC, and V-GMLC belong to the same PLMN, they may comprise one physical entity or different physical entities.

At present, in the LCS specifications of 3GPP, location requests for target UE from LCS clients are classified into two categories: immediate location requests and deferred location requests. With an immediate location request, the LCS system will immediately locate the target UE after receiving a location request for the target UE from a LCS client, and immediately send the location information to the LCS client, that is, the LCS system, after receiving a location request sent by a LCS client, will immediately provide the LCS client with the information of current location of the target UE. With a deferred location request, the LCS client requests that the LCS system provide it with the location information of a target UE at a future moment or when a specific event has occurred, that is, after receiving a location request for a target UE from a LCS client, the LCS system will wait for a deferred period of time till the triggering of a deferred event to provide the LCS client with the current location information of the target UE. The LCS specifications of 3GPP allow a LCS client to request that the LCS system periodically provide it with the location information of a target UE, that is, the LCS client may define the starting time and ending time as well as a certain periodical logic to request the LCS system provide it with the location information of target UE within the time period in accordance with the periodical logic. A periodical request for location information can be regarded as a deferred location request. In the LCS specifications of 3GPP, deferred location requests are further classified into two types, UE available event location requests and change of area event location request.

With a UE available event location request, the LCS client will designate in advance a certain action of the target UE as the triggering event, for instance, when the target UE switches on and gets attached with the network, the LCS system will locate the target UE and returns the location result thereof. In this case, the LCS system saves the triggering event in CN, which monitors the action of the target UE; once it is detected that the action of the target UE satisfying the triggering event has occurred, CN will locate the target UE in coordination with RAN and the location result thereof is returned to the LCS client via GMLC.

With a change of area event location request, the LCS client will designate in advance a target area and events for triggering LCS reports, for instance, the target UE submits to the LCS client LCS area event reports when the target LIE enters, leaves, or is located at the designated target area, in this case, the LCS sends to the target UE the information of the designated target area and events for triggering LCS reports, and the target UE saves the information thereof and initiates at the same time the appropriate application program. When the application program detects the occurrence of an event for triggering LCS reports, for instance, the target UE has entered, left, or been located in the designated target area, the target UE will submit to the LCS system a LCS area event report, and the LCS system will forward to the appropriate LCS client this LCS area event report, informing the LCS client that the event which has been designated for triggering LCS report has occurred.

At present, the LCS specifications of 3GPP have defined the process for a LCS client or LCS system to initiate cancellation of a deferred location request currently in activated state. A detailed description of the process for canceling a deferred location request is given as follows.

FIG. 2 shows the flowchart of canceling a UE available event location request. As shown in FIG. 2, the implementation of canceling a UE available event location request comprises the steps of:

Steps 201-202: The LCS client sends to R-GMLC an LCS Cancel Service Request carrying an identification of UE available event location request; after receiving the LCS Cancel Service Request, R-GMLC forwards this request to H-GMLC.

In addition, when the LCS system determines that the valid period of a UE available event location request has ended, it is needed to end the handling of this UE available event location request. Since relevant information of the location request for target UE from a LCS client, such as the valid time period of the location request, is stored in R-GMLC of the LCS system, R-GMLC is able to determine the UE available event location request that is needed to end according to the above information. R-GMLC then needs to notify the other functions in the LCS system to end the handling of this UE available event location request. At this moment, R-GMLC initiates the cancellation procedure to the UE available event location request that is needed to end. So, for canceling a UE available event location request, R-GMLC will directly send to H-GMLC an LCS Cancel Service Request carrying the identification of a UE available event location request.

Step 203: after receiving the LCS Cancel Service Request carrying the identification of a UE available event location request, H-GMLC forwards this LCS Cancel Service Request to V-GMLC.

Steps 204-205: after receiving the LCS Cancel Service Request carrying the identification of a UE available event location request, V-GMLC sends to CN a request of canceling locating target UE with Provide Subscriber Location message carrying the identification of a UE available event location request; CN, after receiving this Provide Subscriber Location message, deletes self-stored relevant information of the appropriate UE available event location request, and then sends to V-GMLC a Provide Subscriber Location ACK.

Step 206: after receiving the Provide Subscriber Location ACK, V-GMLC sends to H-GMLC an LCS Cancel Service Response, notifying H-GMLC that the appropriate UE available event location request has been canceled.

Steps 207-208: after receiving the LCS Cancel Service Response, H-GMLC deletes the saved relevant information of the appropriate UE available event location request, ends the handling of this location request, and sends to R-GMLC the LCS Cancel Service Response, notifying R-GMLC that the appropriate UE available event location request has been canceled. After receiving the LCS Cancel Service Response, R-GMLC deletes the saved relevant information of the appropriate UE available event location request, ends the handling of this location request, and sends to the LCS client the LCS Cancel Service Response, notifying the LCS client that the appropriate UE available event location request initiated by the LCS client has been canceled.

FIG. 3 shows the flowchart of canceling a change of area event location request. As shown in FIG. 3, the process for canceling a change of area event location request comprises the steps of:

Steps 301-302: the LCS client sends to R-GMLC an LCS Cancel Service Request carrying the identification of a change of area event location request; after receiving the LCS Cancel Service Request, R-GMLC forwards this request to H-GMLC.

In addition, when the LCS system determines that the valid period of a change of area event location request has ended, it is needed to end the handling of this change of area event location request. Since relevant information of the location request for target UE from a LCS client, such as the valid time period of a location request, is stored in R-GMLC of the LCS system, R-GMLC is able to determine the change of area event location request that is needed to end according to the above information. R-GMLC then needs to notify the other functions in the LCS system to end the handling of this change of area event location request. At this moment, R-GMLC initiates the cancellation procedure to the change of area event location request that is needed to end. So, for canceling a change of area event location request, R-GMLC will directly send to H-GMLC an LCS Cancel Service Request carrying the identification of a change of area event location request.

Step 303: after receiving the LCS Cancel Service Request carrying the identification of a change of area event location request, H-GMLC forwards this LCS Cancel Service Request to V-GMLC.

Steps 304-305: after receiving the LCS Cancel Service Request carrying the identification of a change of area event location request, V-GMLC sends to CN a Provide Subscriber Location carrying the identification of a change of area event location request; CN, after receiving this Provide Subscriber Location message, sends to the target UE via RAN an LCS Area Event Cancel carrying the identification of a change of area event location request, notifying the target UE to delete the stored relevant information of this change of area event location request.

Steps 306-308: after receiving the LCS Area Event Cancel, the target UE sends to CN via RAN an LCS Area Event Cancel ACK, notifying CN that the LCS Area Event Cancel sent by CN has been received, deletes the self-stored relevant information of the appropriate change of area event location request in accordance with the identification of a change of area event location request, and then sends to CN an LCS Area Event Report[Cancel], notifying CN that the stored relevant information of the appropriate change of area event location request has been deleted. After receiving the LCS Area Event Report [Cancel], CN sends to V-GMLC a Provide Subscriber Location ACK, notifying V-GMLC that the appropriate change of area event location request has been canceled.

Steps 309-311: after receiving the Provide Subscriber Location ACK, V-GMLC sends to H-GMLC an LCS Cancel Service Response, notifying H-GMLC that the change of area event location request has been canceled. After receiving the LCS Cancel Service Response, H-GMLC deletes the saved relevant information of the appropriate change of area event location request, ends the handling of this location request, and sends to R-GMLC the LCS Cancel Service Response, notifying R-GMLC that the appropriate change of area event location request has been canceled. After receiving the LCS Cancel Service Response, R-GMLC deletes the saved relevant information of the appropriate change of area event location request, ends the handling of this location request, and sends to the LCS client the LCS Cancel Service Response, notifying the LCS client that the appropriate change of area event location request initiated by the LCS client has been canceled.

In practical applications, a target UE may update its own privacy profile, for instance, a target UE may modify the access code of location request from a LCS client, or cancel the authorization for a LCS client to locate it. The privacy profile of a target UE is stored in PPR, which can be an independent entity or integrated in GMLC. If PPR is integrated in GMLC, GMLC will be able to be aware directly that the privacy profile of a target UE has changed when the privacy profile thereof has been updated. If PPR is an independent entity, when the privacy profile of a target UE changes, PPR will inform GMLC by the following process that the privacy profile of the target UE has been updated, as shown in FIG. 4:

Steps 401-402: PPR sends to GMLC an LCS Privacy Profile Update Notification carrying the identity of the target UE, notifying GMLC that the privacy profile of the target UE has changed. After receiving the LCS Privacy Profile Update Notification, GMLC returns to PPR an LCS Privacy Profile Update Notification ACK, notifying PPR that the LCS Privacy Profile Update Notification sent by PPR has been received.

Although in the LCS specifications of 3GPP there is the definition that the LCS system may cancel a deferred location request in activated state affected by the update of privacy profile of the target UE after the LCS system is aware of the update thereof, the LCS system is unable to determine which deferred location requests currently in activated state will be affected by the update of privacy profile of the target UE because there is no appropriate handling process put forward in the LCS specifications of 3GPP, thus it is impossible to make cancellation procedure to these deferred location requests.

SUMMARY OF THE INVENTION

In view of the above, the primary object of this invention is to provide a handling method after update of privacy profile of a target UE such that the LCS system is able to handle properly the location request in accordance with the updated privacy profile of the target UE after the LCS system is aware that the privacy profile thereof has been updated.

To achieve the above object, this invention provides a handling method after updating of privacy profile of a target UE, wherein, when the location service (LCS) system is aware that the privacy profile of the target UE was updated, the method comprising the steps of:

A. For a location request against that UE, the LCS system performing a privacy check, if the said location request passes the privacy check, going to step B, otherwise going to step C;

B. The LCS system continuing to handle the location request until the end of the handling process of the said location request;

C. The LCS system initialing a cancellation procedure to the said location request.

Wherein, before the said step A, the method further comprising: the LCS system deciding whether there is a location request for the said target UE currently in activated state, if yes, going to step A; otherwise ending the current process.

Wherein, when there are more than one location request for the said target UE in activated state, step A is repeated until privacy check for all the location requests for the target UE in activated state have been completed.

Wherein the said performing a privacy check for a location request in step A comprising:

for the location request, the LCS system performing a privacy check based on the updated privacy profile of the target UE, comparing the saved information of the location request with the current privacy profile of the target UE, deciding whether the saved information of the location request satisfies the condition of the current target UE's privacy profile to allow the location information of the target UE to be provided to the LCS client, if the condition is satisfied, the location request will pass the privacy check; otherwise, the location request will not pass the privacy check.

Wherein the type of said location request is a UE available event, and the said step C comprising the steps of:

C11. The Gateway Mobile Location Center (GMLC) initiates to the Core Network (CN) cancellation procedure to the location request carrying the identification of UE available event location request;

C12. CN deletes the saved information corresponding to the said UE available event location request in accordance with the identification of UE available event location request, and then sends to GMLC a message of acknowledgement of canceling the UE available event location request;

C13. GMLC deletes the saved information corresponding to the said UE available event location request in accordance with the identification of UE available event location request.

Wherein the said location request is a change of area event location request, and the said step C comprising the steps of:

C21. The Gateway Mobile Location Center (GMLC) initiating to the Core Network (CN) cancellation procedure to the location request carrying the identification of change of area event location request, and CN initiating to the target UE cancellation procedure to the location request carrying the identification of change of area event location request;

C22. The said target UE deleting the saved information corresponding to the said change of area event location request in accordance with the identification of change of area event location request, and then sending to CN a message of acknowledgement of cancellation the change of area event location request, and CN forwarding to GMLC this message of acknowledgement of cancellation the change of area event location request;

C23. GMLC deleting the saved information corresponding to the said change of area event location request in accordance with the identification of change of area event location request.

Wherein, after the said Step C, the method further comprising: GMLC sending to the LCS client a notification of cancellation the location request.

Wherein the procedure of the location service system is aware that the privacy profile of the target UE was updated comprising:

A0. the Privacy Profile Register (PPR) sending to the GMLC of the LCS system an LCS Privacy Profile Update Notification.

Wherein, after the Step A0, the method further comprising: GMLC returning to PPR an LCS Privacy Profile Update Notification ACK.

Wherein, after the Step C, the method further comprising: the LCS system sending to the LCS client corresponding to the said location request a notification of canceling the location request.

In accordance with the method presented by this invention, the LCS system is able to re-authenticate a location request according to the updated privacy profile of a target UE after the system is aware that the privacy profile of the target UE has been updated, make appropriate processing according to the privacy check result thereof, cancel the location request failing to pass the privacy check, and end in advance the processing of the location request failing to pass the privacy check, thereby saving the resources of the LCS system.

EMBODIMENTS OF THE INVENTION

The present invention is hereinafter described in detail with reference to the accompanying drawings.

In accordance with this invention, after being aware that the privacy profile of a target UE has been updated, the LCS system will make privacy check for the location requests currently in activated state according to the updated privacy profile of the target UE, continuing with the processing of the location requests passing the privacy check while initialing cancellation procedure to the location requests that have failed in the privacy check.

Figure 1:
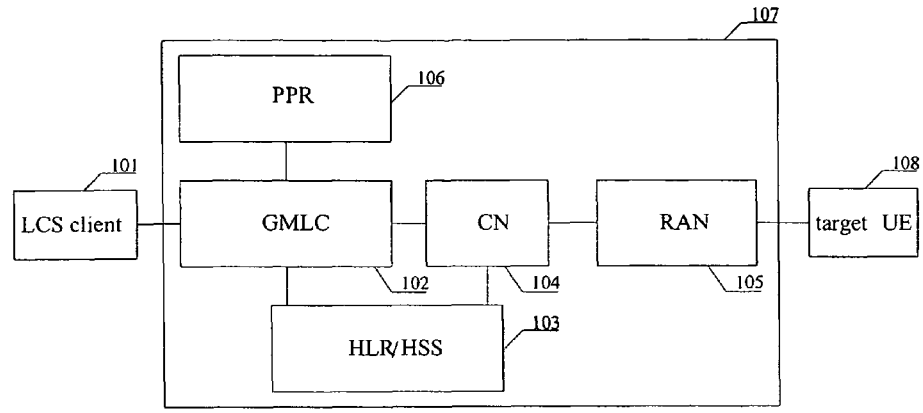
FIG. 1 is a schematic diagram showing the logical structure of LCS functions.
Figure 2:
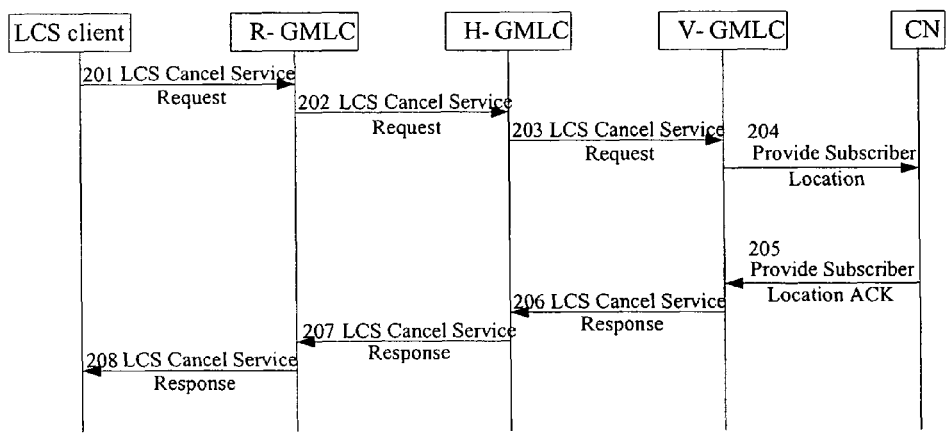
FIG. 2 is the flowchart of canceling a UE available event location request.
Figure 3:
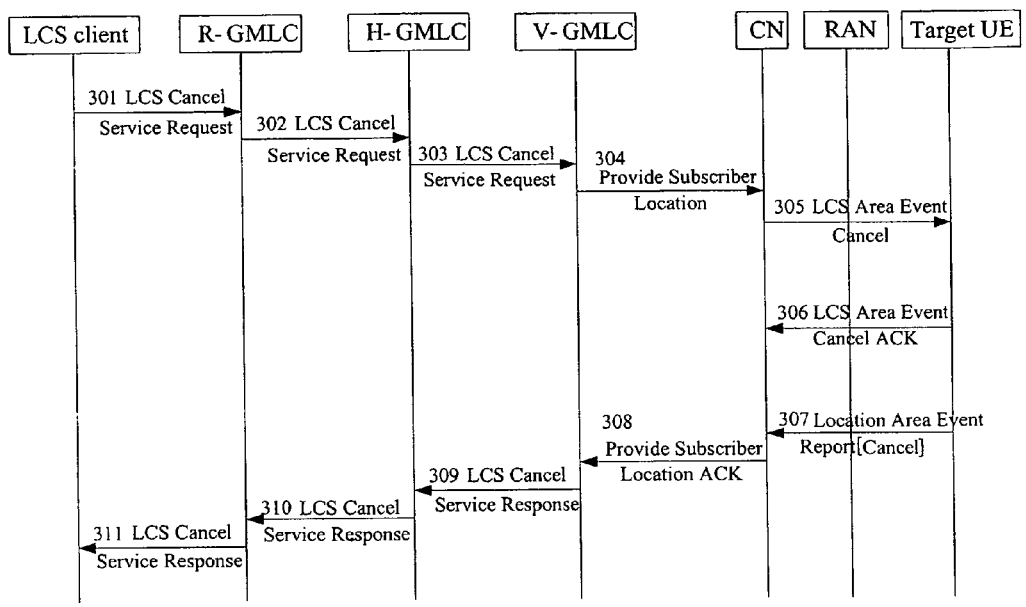
FIG. 3 is the flowchart of canceling a change of area event location request.
Figure 4:
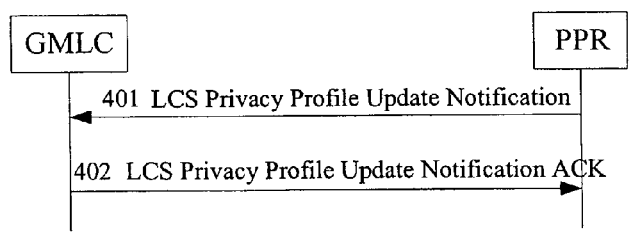
FIG. 4 is the flowchart of GMLC is aware that the privacy profile of a target UE has been updated.
Figure 5:
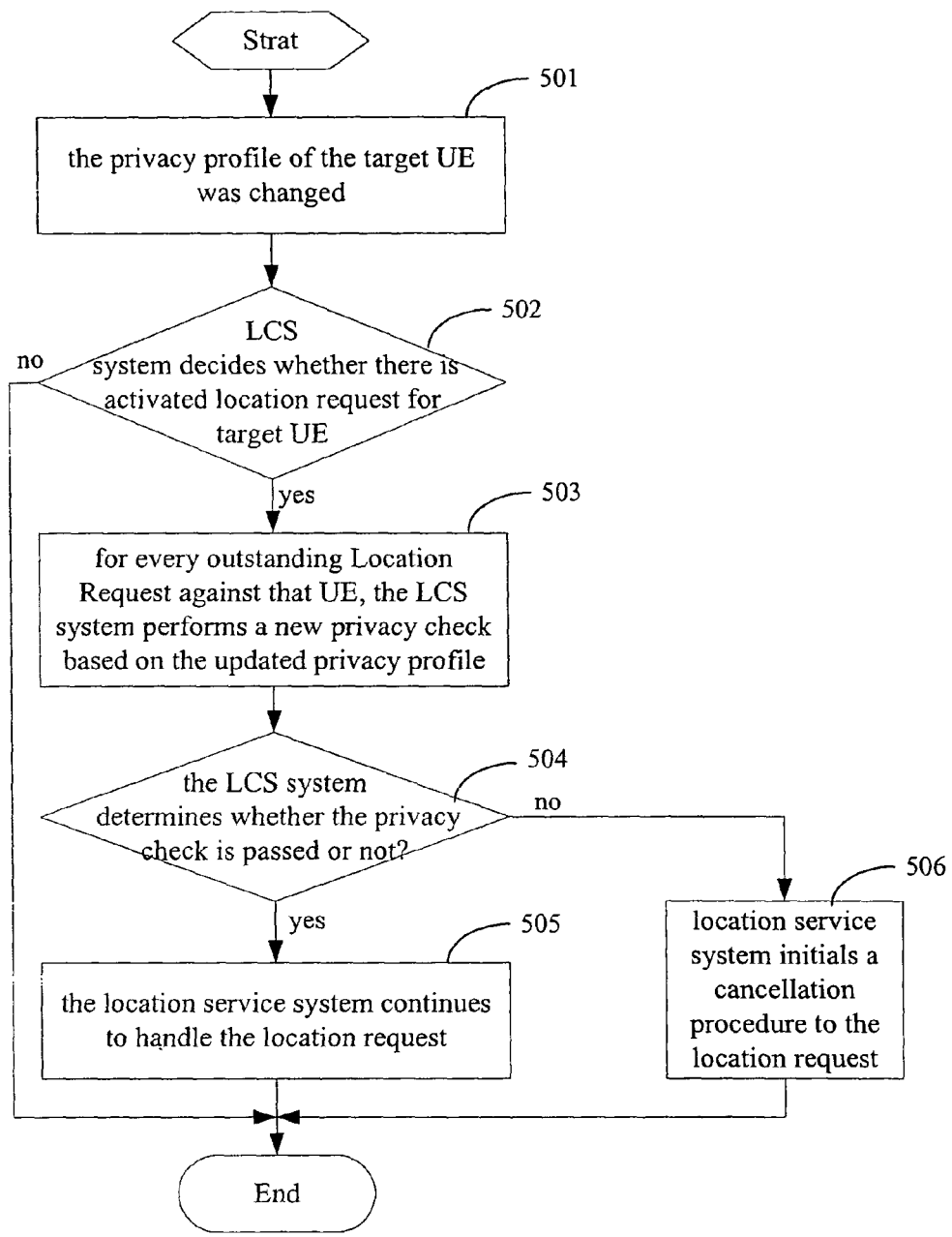
FIG. 5 shows the handling process in accordance with this invention after update of privacy profile of a target UE.

FIG. 5 shows the handling process after update of privacy profile of a target UE in accordance with this invention. As shown in FIG. 5, the handling process after update of privacy profile of a target UE comprises the steps of:

Steps 501-502: The LCS system, after being aware that the privacy profile of a target UE has been updated, decides whether there are location requests currently in activated state for this target UE, if yes, perform step 503; otherwise, end the current process. Furthermore, the LCS system may decide only whether there are deferred location requests currently in activated state for this target UE, if yes, perform step 503; otherwise, end the current process.

Steps 503-504: The LCS system makes privacy check for the location request for the target UE currently in activated state according to the updated privacy profile of the target UE, and decides whether the saved information of the location request satisfies the condition of the current target UE's privacy profile to allow the location information of the target UE to be provided to the LCS client, if it meets the condition, the LCS system will regard this location request as passing the privacy check, and then perform step 505; otherwise, the LCS system will regard this location request as failing to pass the privacy check, then perform step 506.

Step 505: The LCS system continues with the processing of the location request.

Step 506: The LCS system initials the cancellation procedure to the location request.

In case of more than one location request currently in activated state for the target UE, repeat steps 503-504 until privacy check for every location request currently in activated state is completed.

Figure 6:
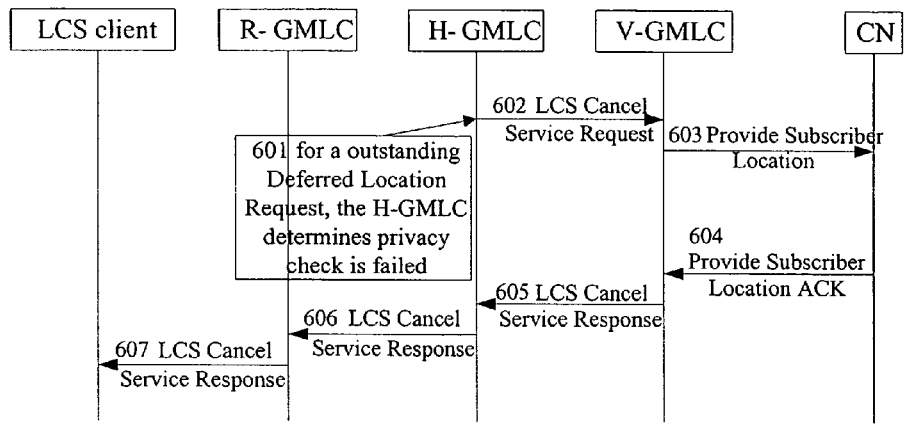
FIG. 6 is the flowchart of canceling a UE available event location request in accordance with this invention.

FIG. 6 shows the flowchart of canceling a UE available event location request in accordance with this invention. As shown in FIG. 6, the process of canceling a UE available event location request comprises the steps of:

Steps 601-603: After being aware that the privacy profile of a target UE has been updated, H-GMLC decides that there are UE available event location requests currently in activated state, and makes privacy check for the UE available event location requests for this target UE currently in activated state according to the updated privacy profile of the target UE. For instance, according to the updated privacy profile of the target UE about positioning authorization for LCS clients to locate the UE, H-GMLC makes privacy check for LCS client-sent UE available event location requests for the target UE. After identifying a UE available event location request that has failed in the privacy check, H-GMLC sends to V-GMLC an LCS Cancel Service Request carrying the identification of the UE available event location request. After receiving this LCS Cancel Service Request, V-GMLC sends to CN a Provide Subscriber Location request carrying the identification of the UE available event location request.

When the privacy profile of the target UE is saved in PPR, at the request of H-GMLC, PPR can make the above privacy check for UE available event location requests for the target UE in activated state based on the updated privacy profile of the target UE. After privacy check, PPR returns to H-GMLC the result of the privacy check for the UE available event location requests, based on which H-GMLC will decide whether to initiate the canceling process for these UE available event location requests.

Steps 604-605: After receiving the Provide Subscriber Location request, CN deletes the saved relevant information of the corresponding UE available event location request according to the identification of the UE available event location request, and then sends to V-GMLC a Provide Subscriber Location ACK. After receiving the Provide Subscriber Location ACK, V-GMLC sends to H-GMLC an LCS Cancel Service Response, notifying H-GMLC that the corresponding UE available event location request has been canceled.

Steps 606-607: After receiving the LCS Cancel Service Response, H-GMLC deletes the saved relevant information of the corresponding UE available event location request, ends the handling of this location request, and forwards the LCS Cancel Service Response to R-GMLC. After receiving the LCS Cancel Service Response, R-GMLC deletes the saved relevant information of the corresponding UE available event location request, ends the handling of this location request, and forwards the LCS Cancel Service Response to the LCS client, notifying the LCS client that the corresponding UE available event location request initiated by the LCS client has been canceled.

If H-GMLC determines that there are more than one UE available event location request that have failed in the privacy check, more identifications of UE available event location request can be carried in one LCS Cancel Service Request. After receiving a Provide Subscriber Location request carrying a plurality of identifications of UE available event location request, CN will initial the cancellation procedure to each of the UE available event location requests one by one such that repeated sending of a plurality of LCS Cancel Service Requests is avoided, thereby saving the resources of the LCS system.

Figure 7:
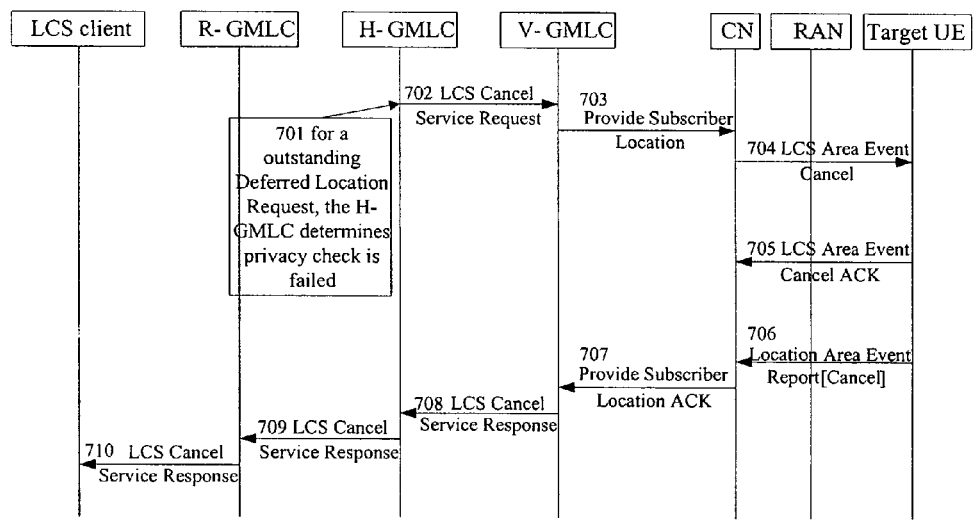
FIG. 7 is the flowchart of canceling a change of area event location request in accordance with this invention.

FIG. 7 shows the flowchart of canceling a change of area event location request in accordance with this invention. As shown in FIG. 7, the process of canceling a change of area event location request comprises the steps of:

Steps 701-703: After being aware that the privacy profile of a target UE has been updated, H-GMLC decides that there are requests of change of area event currently in activated state, and makes privacy check for the requests of change of area event for this target UE currently in activated state based on the updated privacy profile of the target UE. For instance, according to the updated privacy profile of the target UE about positioning authorization for LCS clients to locate the UE, H-GMLC makes privacy check for the LCS client-sent requests of change of area event for the target UE. After identifying a change of area event location request that has failed in the privacy check, H-GMLC sends to V-GMLC an LCS Cancel Service Request carrying the identification of the change of area event location request. After receiving the LCS Cancel Service Request carrying the identification of the change of area event location request, V-GMLC sends to CN a Provide Subscriber Location request carrying the identification of the change of area event location request.

Steps 704-706: After receiving the Provide Subscriber Location request, CN sends to the target UE via RAN an LCS Area Event Cancel request carrying the identification of the change of area event location request, notifying the target LE to delete the saved relevant information of this change of area event location request. After receiving the LCS Area Event Cancel request, the target UE sends to CN via RAN an LCS Area Event Cancel ACK, notifying CN that the LCS Area Event Cancel request sent by CN has been received; then deletes the self-stored relevant information of the change of area event location request according to the identification of the change of area event location request; and finally sends to CN a LSC area event Report[Cancel], notifying CN that the saved relevant information of the corresponding change of area event location request has been deleted.

Steps 707-708: After receiving the LSC area event Report [Cancel], CN sends to V-GMLC a Provide Subscriber Location ACK. After receiving the Provide Subscriber Location ACK, V-GMLC sends to H-GMLC an LCS Cancel Service Response, notifying H-GMLC that the corresponding change of area event location request has been canceled.

Steps 709-710: After receiving the LCS Cancel Service Response, H-GMLC deletes the saved relevant information of the corresponding change of area event location request, ends the handling of this location request, and forwards the LCS Cancel Service Response to R-GMLC. After receiving the LCS Cancel Service Response, R-GMLC deletes the saved relevant information of the corresponding change of area event location request, ends the handling of this location request, and forwards the LCS Cancel Service Response to the LCS client, notifying the LCS client that the corresponding change of area event location request initiated by the LCS client has been canceled.

If H-GMLC determines that there are more than one change of area event location request that have failed in the privacy check, more identifications of change of area event location request can be carried in one LCS Cancel Service Request. After receiving an LCS Area Event Cancel request carrying a plurality of identifications of change of area event location request, the target UE will initial the cancellation procedure to each of the requests of change of area event one by one. Thereafter, CN will, in accordance with the received Provide Subscriber Location request carrying a plurality of identifications of LE available event location request, notify the target LE via RAN to initial the cancellation procedure to each of the requests of change of area event such that repeated sending of a plurality of requests is avoided, thereby saving the resources of the LCS system.

The above embodiments have taken H-GMLC as an example to initiate the cancellation procedure to location requests failing in the privacy check. In fact, the canceling operation thereof can also be initiated by R-GMLC or V-GMLC.

To sum up, the above description is on the preferred embodiments of this invention and is not to be construed as limits to the protection scope of this invention.

The invention claimed is:

1. A handling method after updating of privacy profile of a target UE, the method comprising:
   when a location service (LCS) system is aware that a privacy profile of the target UE was updated, for a deferred location request in activated state against the target UE, the deferred location request being from a LCS client requesting for location information of the target UE, the LCS system performing a privacy check based on the updated privacy profile of the target UE,
   if the deferred location request passes the privacy check, the LCS system continuing to handle the deferred location request;
   otherwise, if the deferred location request does not pass the privacy check, the LCS system initializing a cancellation procedure to the deferred location request,
   wherein the deferred location request is a UE available event location request, and initiating the cancellation procedure comprises the steps of:
   a Gateway Mobile Location Center (GMLC) of the LCS system sending to a Core Network (CN) a request for cancelling the deferred location request, the cancellation request carrying an identification of the UE available event location request;
   the CN deleting saved information corresponding to the UE available event location request in accordance with the received identification of the UE available event location request, and then sending to the GMLC a message of acknowledgement of the cancellation of the UE available event location request;
   the GMLC deleting saved information corresponding to the UE available event location request in accordance with the identification of the UE available event location request upon receiving the acknowledgement message from the CN.

2. A method according to claim 1, wherein, when there are more than one deferred location request against the target UE in activated state, for each of the deferred location request in activated state, performing by the LCS system the privacy check.

3. A method according to claim 1, wherein performing a privacy check comprises:
   for the deferred location request, the LCS system comparing saved information of the deferred location request with the updated privacy profile of the target UE, deciding whether the saved information of the deferred location request satisfies a condition of the target UE's updated privacy profile to allow the location information of the target UE to be provided to the LCS client, if the condition to allow the location information of the target UE to be provided to the client is satisfied, the deferred location request passing the privacy check; otherwise, if the condition is not satisfied, the location request not passing the privacy check.

4. A method according to claim 1, the method further comprising: the GMLC sending to the LCS client a notification for notifying the cancellation of the UE available event location request.

5. A method according to claim 1, wherein the procedure of the location service system is aware that the privacy profile of the target UE was updated comprises:
a Privacy Profile Register (PPR) sending to a GMLC of the LCS system an LCS Privacy Profile Update Notification.

6. A method according to claim 5, after the PPR sends the LCS Privacy Profile Update Notification, the method further comprising: the GMLC returning to the PPR an LCS Privacy Profile Update Notification ACK.

7. A method according to claim 1, the method further comprising: the LCS system sending to the LCS client a notification of the cancellation of the deferred location request.

8. A method according to claim 1, wherein, if the LCS client is allowed to have the location information of the target UE, the deferred location request passes the privacy check; if the LCS client is not allowed to have the location information of the target UE, the deferred location request does not pass the privacy check.

9. The method according to claim 1, wherein the privacy profile of the target UE is stored in a mobile location centre or a privacy profile register (PPR) of the location system.

10. A handling method after updating of privacy profile of a target UE, the method comprising:
when a location service (LCS) system is aware that a privacy profile of the target UE was updated, for a deferred location request in activated state against the target UE, the deferred location request being from a LCS client requesting for location information of the target UE, the LCS system performing a privacy check based on the updated privacy profile of the target UE,
if the deferred location request passes the privacy check, the LCS system continuing to handle the deferred location request;
otherwise, if the deferred location request does not pass the privacy check, the LCS system initializing a cancellation procedure to the deferred location request,
wherein the deferred location request is a change of area event deferred location request, and the initiating the cancellation procedure to the deferred local request comprises the steps of:
a Gateway Mobile Location Center (GMLC) initiating to a Core Network (CN) a request for cancelling the change of area event location request, the request for cancelling carrying an identification of the change of area event location request, and the CN sending to the target UE a cancellation request carrying the identification of change of area event location request;
the target UE deleting information saved in the target UE corresponding to the change of area event location request in accordance with the identification of the change of area event location request upon the reception of the cancellation request from the CN, and sending to the CN a message of acknowledgement of the cancellation of the change of area event location request, and the CN forwarding to the GMLC the acknowledgement message for notifying the cancellation the change of area event location request;
the GMLC deleting saved information corresponding to the change of area event location request in accordance with the identification of the change of area event location request upon receiving the acknowledge message from the CN.

11. A method according to claim 10, the method further comprising: the GMLC sending to the LCS client a notification of the cancellation of the change of area event deferred location request.

12. A method according to claim 10, wherein, when there are more than one deferred location request against the target UE in activated state, for each of the deferred location request in activated state, performing by the LCS system the privacy check.

13. A method according to claim 10, wherein performing a privacy check comprises:
for the deferred location request, the LCS system comparing saved information of the deferred location request with the updated privacy profile of the target UE, deciding whether the saved information of the deferred location request satisfies a condition of the target UE's updated privacy profile to allow the location information of the target UE to be provided to the LCS client, if the condition to allow the location information of the target UE to be provided to the client is satisfied, the deferred location request passing the privacy check; otherwise, if the condition is not satisfied, the location request not passing the privacy check.

14. A method according to claim 10, wherein the procedure of the LCS system is aware that the privacy profile of the target UE was updated comprises:
a Privacy Profile Register (PPR) sending to a GMLC of the LCS system an LCS Privacy Profile Update Notification.

15. A method according to claim 14, after the PPR sends the LCS Privacy Profile Update Notification, the method further comprising: the GMLC returning to the PPR an LCS Privacy Profile Update Notification ACK.

* * * * *